United States Patent
Forgues et al.

(10) Patent No.: US 9,921,326 B2
(45) Date of Patent: Mar. 20, 2018

(54) SUBTERRANEAN FORMATION MONITORING USING FREQUENCY DOMAIN WEIGHTED ANALYSIS

(71) Applicant: CGG SERVICES SA, Massy (FR)

(72) Inventors: Eric Forgues, Bures-sur-Yvette (FR); Michael Beilles, Palaiseau (FR); Cécile Berron, Massy (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 15/120,366

(22) PCT Filed: Feb. 24, 2015

(86) PCT No.: PCT/IB2015/000493
§ 371 (c)(1),
(2) Date: Aug. 19, 2016

(87) PCT Pub. No.: WO2015/128732
PCT Pub. Date: Sep. 3, 2015

(65) Prior Publication Data
US 2017/0068010 A1 Mar. 9, 2017

Related U.S. Application Data

(60) Provisional application No. 61/944,077, filed on Feb. 25, 2014.

(51) Int. Cl.
*G01V 1/36* (2006.01)
*G01V 1/28* (2006.01)
(Continued)

(52) U.S. Cl.
CPC .............. *G01V 1/364* (2013.01); *G01V 1/003* (2013.01); *G01V 1/306* (2013.01);
(Continued)

(58) Field of Classification Search
CPC ........ G01V 1/364; G01V 1/306; G01V 1/003; G01V 2210/21; G01V 2210/322; G01V 2210/324
(Continued)

(56) References Cited

U.S. PATENT DOCUMENTS 3,474,404 A * 10/1969 Silverman ................ G01V 1/32
367/64
4,775,009 A * 10/1988 Wittrisch ............ E21B 17/1035
166/250.11
(Continued)

FOREIGN PATENT DOCUMENTS

WO        01/59481 A1    8/2001
WO    2012/178099 A2    12/2012

OTHER PUBLICATIONS

International Search Report in related International Application No. PCT/IB2015/000493, dated Oct. 14, 2015.
(Continued)

*Primary Examiner* — Daniel L Murphy
(74) *Attorney, Agent, or Firm* — Patent Portfolio Builders PLLC

(57) ABSTRACT

The disclosed method includes receiving resulting signals emanating from a subterranean formation, wherein the resulting signals are caused by signals emitted from seismic sources. The method further includes dividing the resulting signals into a plurality of sub-samples. The method includes determining a frequency content of one or more of the sub-samples and assigning a weight to or more components of the frequency content of the sub-sample to produce a weighted frequency content of the sub-sample, wherein the assigned weight is based, at least in part, on an estimate of the amount of noise present in the frequency content of the sub-sample. The method further includes combining the weighted frequency contents of the sub-samples to produce
(Continued)

a weighted sample. The method further includes determining one or more properties of the subsurface formation based, at least in part, on the weighted sample.

20 Claims, 5 Drawing Sheets

(51) Int. Cl.
G01V 1/00 (2006.01)
G01V 1/30 (2006.01)
(52) U.S. Cl.
CPC .... *G01V 2210/21* (2013.01); *G01V 2210/322* (2013.01); *G01V 2210/324* (2013.01)
(58) Field of Classification Search
USPC .................................................. 367/43, 38
See application file for complete search history.

(56) References Cited

U.S. PATENT DOCUMENTS

| 4,882,713 | A |  | 11/1989 | Hughes |
| 4,905,204 | A |  | 2/1990 | Hughes |
| 5,417,283 | A | * | 5/1995 | Ejiogu ............... E21B 43/2406 166/245 |
| 5,870,691 | A |  | 2/1999 | Partyka et al. |
| 5,971,095 | A |  | 10/1999 | Ozbek |
| 6,446,008 | B1 |  | 9/2002 | Ozbek |
| 6,519,533 | B1 |  | 2/2003 | Jeffryes |
| 6,535,818 | B1 |  | 3/2003 | Baeten |
| 6,574,567 | B2 |  | 6/2003 | Martinez |
| 6,950,371 | B2 |  | 9/2005 | Herkenhoff et al. |
| 7,333,392 | B2 |  | 2/2008 | Burnstad |
| 2002/0180613 | A1 | * | 12/2002 | Shi ....................... G01V 11/002 340/853.1 |
| 2002/0191490 | A1 |  | 12/2002 | Meunier |
| 2010/0262372 | A1 |  | 10/2010 | Le Calvez et al. |
| 2012/0163122 | A1 |  | 6/2012 | Ozdemir et al. |
| 2012/0215453 | A1 |  | 8/2012 | Poole |
| 2013/0044567 | A1 | * | 2/2013 | Kratz .................... G01V 1/288 367/31 |
| 2013/0155813 | A1 |  | 6/2013 | Huo et al. |

OTHER PUBLICATIONS

Written Opinion of the International Searching Authority in related International Application No. PCT/IB2015/000493, dated Oct. 14, 2015.

G. Liu et al., "Stacking Seismic Data Using Local Correlation", Geophysics, 2009, vol. 74, No. 3, pp. V43-V48.

R. Neelamani et al., "Stack-and-Denoise: A New Method to Stack Seismic Datasets", SEG Annual Meeting, New Orleans, Louisiana, 2006, pp. 2827-2831.

* cited by examiner

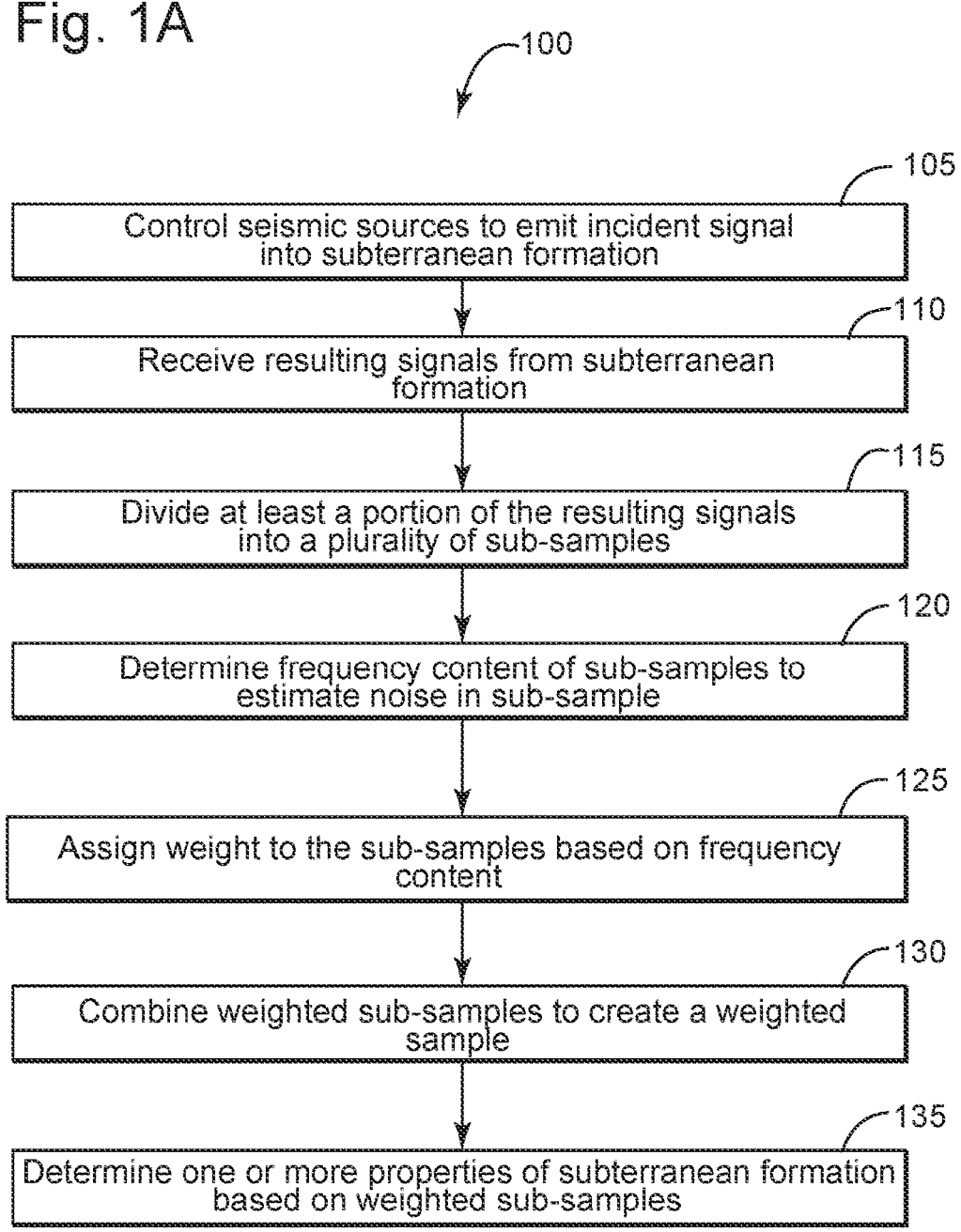

SUBTERRANEAN FORMATION MONITORING USING FREQUENCY DOMAIN WEIGHTED ANALYSIS

CROSS-REFERENCE TO RELATED APPLICATION

This application claims the benefit under 35 U.S.C. § 119(e) of U.S. Provisional Application Ser. No. 61/944,077 filed on Feb. 25, 2014, entitled "Processing Method for Signal to Noise Enhancement by Weighted Summation in the Frequency Domain," which is incorporated by reference in its entirety for all purposes.

TECHNICAL FIELD

The present invention relates to a method and to a device intended for seismic monitoring of a subterranean zone, such as a reservoir, using seismic sources.

BACKGROUND

In the oil and gas industry, geophysical survey techniques are commonly used to aid in the search for and evaluation of subterranean hydrocarbon or other mineral deposits. Geophysical survey techniques are also used to monitor features of a subterranean formation over short or long periods of time. Generally, a seismic energy source, or "seismic source," generates a seismic signal that propagates into the earth and is partially reflected by subsurface seismic interfaces between underground formations having different acoustic impedances. The reflections are recorded by seismic detectors, or "receivers," located at or near the surface of the earth, in a body of water, or at known depths in boreholes, and the resulting seismic data can be processed to yield information relating to the location and physical properties of the subsurface formations. Seismic data acquisition and processing generates a profile, or image, of the geophysical structure under the earth's surface. While this profile may not directly show the location for oil and gas reservoirs, those trained in the field can use such profiles to more accurately predict the location of oil and gas, and thus reduce the chance of drilling a non-productive well.

Various sources of seismic energy have been used to impart the seismic waves into the earth. Such sources have included two general types: 1) impulsive energy sources and 2) seismic vibrator sources. The first type of geophysical prospecting utilizes an impulsive energy source, such as dynamite, a mud gun, or a marine air gun, to generate the seismic signal. With an impulsive energy source, a large amount of energy is injected into the earth in a very short period of time. In the second type of geophysical prospecting, a vibrator is used to propagate energy signals over an extended period of time, as opposed to the near instantaneous energy provided by impulsive sources.

The seismic process employing such use of a seismic vibrator, sometimes referred to as "vibroseis," propagates energy signals into the earth over an extended period of time or "sweep." In such instances, energy at a starting frequency is first imparted into the earth and the vibration frequency changes over the sweep interval at some rate until the stopping frequency is reached at the end of the interval. The difference between the starting and stopping frequencies of the sweep generator is known as the "sweep frequency range," and the amount of time used to sweep through those frequencies is known as the "sweep length." The recorded data may then be correlated with the sweep signal to produce an interpretable record which resembles a conventional seismic record like one from an impulsive source. In land-based implementations, the seismic source signal is generally generated by a servo-controlled hydraulic vibrator, or "shaker unit," mounted on a mobile base unit. In marine implementations, vibrators typically include a bell-shaped housing with a large piston or a diaphragm in its open end. The vibrator is lowered into the water from a marine survey vessel, and the diaphragm is vibrated by a hydraulic drive system similar to that used in a land vibrator.

A seismic signal may be also generated by a SEISMOVIE™ system designed and manufactured by CGG Services SA (Massy, France). A SEISMOVIE™ system may emit energy at individual frequencies, one-by-one, until approximately the entire frequency band is emitted. While a SEISMOVIE™ system does not perform a sweep, a frequency band from the starting frequency to the stopping frequency may still be emitted to create an essentially complete discrete frequency dataset. Except where expressly stated herein, "seismic source" is intended to encompass any seismic source implementation, both impulse and vibratory, including any dry land, transition zone, or marine implementations thereof.

The seismic signal is emitted in the form of a wave that is reflected off interfaces between geological layers. The reflected waves are received by an array of geophones, or receivers, located at or near the earth's surface, which convert the displacement of the ground resulting from the propagation of the waves into an electrical signal recorded by means of recording equipment. The receivers typically receive data during the seismic source's sweep interval and during a subsequent "listening" interval. The receivers record the particle motion or pressure in the medium (for example soil, rock, or water) at their location. The received signals can be processed to estimate the travel time from the seismic source to the receiver. Travel time, in combination with velocity information, can be used to reconstruct the path of the waves to create an image of the subsurface.

A large amount of data may be received by the receivers and the received signals may be recorded and subjected to signal processing before the data is ready for interpretation. The recorded seismic data may be processed to yield information relating to the location of the subsurface reflectors and the physical properties of the subsurface formations. That information is then used to generate an image of the subsurface.

In some implementations, seismic sources and receivers may be used to monitor subterranean formations. In certain environments, such as during fluid production from a subterranean reservoir, impulsive seismic noise may be received by the seismic receivers in addition to the desired signals from the seismic sources. This impulsive seismic noise may lower the signal-to-noise ratio of the signals received by the seismic receivers. This seismic noise may be caused, for example, by pump jacks that are used to extract fluid from the subterranean reservoir. Other source of impulsive seismic noise may impact the signal-to-noise ratio of the seismic signals received by the seismic receivers.

SUMMARY

In one embodiment, the present disclosure may include a method for seismic monitoring of a subterranean formation. The method includes receiving resulting signals emanating from the subterranean formation, wherein the resulting signals are caused, at least in part, by incident signals emitted from a plurality of seismic sources located above the subsurface formation and wherein the resulting signals are received for a predetermined emission length of time. The method further includes dividing at least a part of the resulting signals into a plurality of sub-samples. The method includes, for one or more of the sub-samples, determining a frequency content of the sub-sample and assigning a weight to or more components of the frequency content of the sub-sample to produce a weighted frequency content of the sub-sample, wherein the assigned weight is based, at least in part, on an estimate of the amount of noise present in the frequency content of the sub-sample. The method further includes combining the weighted frequency contents of the sub-samples to produce a weighted sample. The method further includes determining one or more properties of the subsurface formation based, at least in part, on the weighted sample.

In another embodiment, the present disclosure may include a seismic monitoring entity with one or more seismic sources to emit incident signals into a subterranean formation, one or more seismic receivers to receive resulting signals emanating from the subsurface formation, at least one processor, and a memory including non-transitory executable instructions. When the non-transitory executable instructions are executed, the instruction cause the at least one processor to divide at least a part of the resulting signals into a plurality of sub-samples. When the non-transitory executable instructions are executed, the instruction cause the at least one processor to, for one or more of the sub-samples, determine a frequency content of the sub-sample and assign a weight to or more components of the frequency content of the sub-sample to produce a weighted frequency content of the sub-sample, wherein the assigned weight is based, at least in part, on an estimate of the amount of noise present in the frequency content of the sub-sample. When the non-transitory executable instructions are executed, the instruction cause the at least one processor to combine the weighted frequency contents of the sub-samples to produce a weighted sample. When the non-transitory executable instructions are executed, the instruction cause the at least one processor to determine one or more properties of the subsurface formation based, at least in part, on the weighted sample.

In another embodiment, the present disclosure may include a non-transitory computer-readable medium that includes executable instructions. When the non-transitory executable instructions are executed, the instruction cause a processor to receive resulting signals emanating from the subsurface formation, wherein the resulting signals are caused, at least in part, by incident signals emitted from a plurality of sources located above the subsurface formation and wherein the resulting signals are received for a predetermined emission length of time. When the non-transitory executable instructions are executed, the instructions cause the processor to divide at least a part of the resulting signals into a plurality of sub-samples. When the non-transitory executable instructions are executed, the instruction cause the processor to, for one or more of the sub-samples, determine a frequency content of the sub-sample and assign a weight to or more components of the frequency content of the sub-sample to produce a weighted frequency content of the sub-sample, wherein the assigned weight is based, at least in part, on an estimate of the amount of noise present in the frequency components of the sub-sample. When the non-transitory executable instructions are executed, the instructions cause the processor to combine the weighted frequency contents of the sub-samples to produce a weighted sample. When the non-transitory executable instructions are executed, the instruction cause the processor to determine one or more properties of the subsurface formation based, at least in part, on the weighted sample.

BRIEF DESCRIPTION OF THE DRAWINGS

For a more complete understanding of the present disclosure and its features and advantages, reference is now made to the following description, taken in conjunction with the accompanying drawings, in which like reference numbers indicate like features and wherein:

FIGS. 1A and 1B illustrate flow charts of example methods for performing a seismic monitoring of a subterranean formation in accordance with some embodiments of the present disclosure.

DETAILED DESCRIPTION

Seismic monitoring systems use one or more seismic sources to emit one or more seismic signals into a subterranean formation. Vibratory seismic sources can emit a seismic signal where energy is emitted at a single frequency one-by-one, either in a frequency sweep or a set of one or more monofrequencies. Thereafter the resulting signals reflected from the subterranean formation may be received an analyzed to determine one or more properties of the subterranean formation. The received signals may also include frequency components caused by impulsive seismic sources. For example, the received signals may include noise cause by the pumping of fluids from a reservoir in the subterranean formation. Therefore, according to the teachings of the present disclosure, systems and methods are presented that estimate the noise content of a received seismic signal and assign a weight to the signal based on the estimated noise in the signal. The use of a vibratory source that can emit a seismic signal containing multiple frequencies simultaneously may improve the SNR of the seismic data and improve the seismic acquisition efficiency.

FIG. 1A is a flow chart of an example method of monitoring a subterranean formation. The steps of method 100 can be performed by an engineer or operator, a user, various computer programs, models, or any combination thereof, configured to deploy, operate, simulate, design, and analyze data from seismic exploration signal systems, equipment, or devices. The programs and models may include instructions stored on a computer-readable medium and operable to perform one or more of the steps of the method. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer-readable media. Collectively, the engineer, operator, user, or computer programs and models used to deploy, operate, simulate, design, and analyze data from seismic exploration systems may be referred to as a "seismic monitoring entity."

Figure 2:
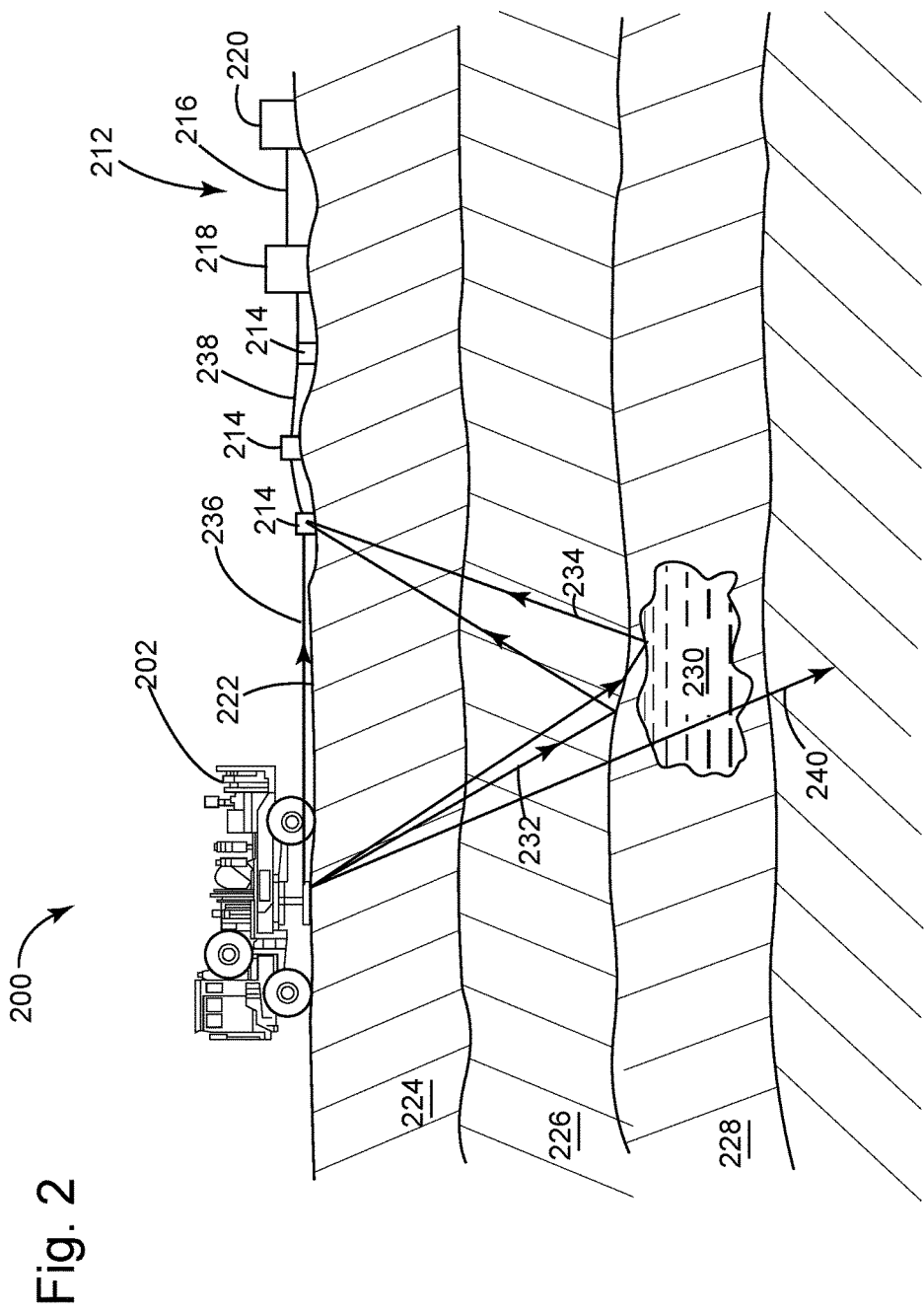
FIGS. 2 and 3 are elevation views of example seismic monitoring systems configured to monitor a subterranean formation in accordance with some embodiments of the present disclosure.

As will be discussed in greater detail with respect to FIGS. 2 and 3, one or more seismic sources, such as seismic sources, are located above a subterranean formation of interest. One or more seismic receivers are also located above the subterranean formation of interest. In the case of long-term monitoring of a fluid reservoir in a subterranean formation, at least some of the seismic receivers and sources may be permanently installed.

In block 105, the seismic sources are controlled to emit an incident signal into the subterranean formation. In certain example embodiments, each of the seismic sources emits incident signals with the same frequency. The frequency of the incident signal may be chosen to penetrate the subterranean formation and potentially provide useful information about the subterranean formation. In other example embodiments, the seismic sources are controlled to produce signals with at least two different frequencies. In general, when the seismic sources produce incident signals with different frequencies, the frequencies of a second signal are chosen to not be a harmonic of the frequency of a first signal. In other implementations, however, one or more of the frequencies emitted by the seismic source are harmonics.

In certain example embodiments, the incident signals emitted by the seismic sources may have a predetermined duration of several seconds, such as 5, 10, 20, 30, 40, or 50 seconds. In other example embodiments, the incident signals may have duration of a minute or more, such as 1 minute, 2 minutes, 3 minutes, 4 minutes, or 5 minutes.

In some embodiments, the number of frequencies emitted by the seismic sources is based on the type of geology in the earth's subsurface. For example, signal attenuation may be observed with certain types of geology. Therefore, the incident seismic signals may be designed to emit several frequencies in the frequency ranges where the signal attenuation is observed. The emission of multiple frequencies in the signal attenuation range may increase the SNR of the resulting seismic data. In other embodiments, the number of frequencies included in the seismic signal may be based on the noise level of the environment at the location of the seismic acquisition. The noise may be caused by generators, machines, electronics, or any other equipment in the acquisition area and may occur in a specific bandwidth. The seismic signal may be designed to include frequencies in the noisy bandwidths to increase the SNR in the noisy bandwidth region.

The amplitudes of the incident seismic signals may be determined and adjusted to increase the amplitude of the seismic signal at frequencies where the noise is present or where noise is high. For example, the amplitude of the incident seismic signal with a selected frequency component may be increased to be higher than the amplitude of the observed noise at or around the frequencies where noise is present at the seismic acquisition area. When selecting amplitude of the incident seismic signal, the seismic monitoring entity may also consider safety, regulatory, environmental, infrastructure, and equipment limitations. Additionally, the seismic exploration entity may adjust the relative phase of the selected frequencies components that are included in the incident seismic signals. The relative phase may be adjusted to maximize the seismic signal output based on seismic source equipment constraints. In some example embodiments the timing and duration of the incident signal are adjusted based on equipment constraints. In some example embodiments the timing and duration of the incident signal are adjusted based on environmental constraints. In some example embodiments the timing and duration of the incident signal are adjusted based on known ambient noise in the area. For example, if the subterranean formation being monitored is near a railroad track with known train schedule, the system may perform monitoring during period when a train is not scheduled to be nearby.

In some embodiments, the seismic sources may have nonlinearities and may not behave ideally and therefore may have a frequency response that adds a phase shift and/or amplitude droop at different frequencies. To correct the phase shift or amplitude droop, harmonics may be added to counteract the harmonics created by the nonlinearities in the seismic source. In certain example, the output of the seismic source monitored. For example, the output may be measured and compared to the designed output. The phase and amplitude of the harmonics included in the seismic signal may be adjusted to provide a mechanism for achieving the output as designed.

In certain example embodiments, the seismic monitoring entity measures the received seismic signal and compares the received seismic signal to the incident seismic signal. Based on the comparison, the seismic monitoring entity may alter later incident seismic signals to compensate for effects observed in the received seismic signals, such as phase shifts, amplitude droop, or other effect. In certain example embodiments, the incident seismic signal (or a pilot signal that is used to generate incident seismic signal) includes adjustments to its amplitude or phase to compensate effects observed in the received seismic signal.

The number of frequencies or harmonics included in incident seismic signal, along with the phase and amplitude of those frequencies, may be based on many factors. In some embodiments, the type of geology in the earth's subsurface may be used to determine the number of frequencies to include in the seismic signal. For example, seismic signal attenuation may be observed with certain types of geology. Therefore, incident seismic signal may be designed to emit energy at several frequencies in the frequency ranges where the signal attenuation is observed and may therefore increase the SNR. In other embodiments, the noise level of the environment at the location of the seismic acquisition may be used to determine the frequencies and amplitude of incident seismic signal. For example, noise may be caused by equipment located in the acquisition area such as generators, machines, electronics, or any other noise generating device. The noise may occur in a specific bandwidth. Example incident seismic signals may be designed to include frequencies with high amplitudes (high energy) in the noisy bandwidths to increase the SNR in the noisy bandwidth region. An increased SNR may cause the resultant seismic data to be more useful for data processing, such as inversion data processing after the seismic data acquisition.

Incident seismic signals may be emitted by any suitable vibratory seismic source that provides the ability to control the phase and amplitude of the emitted signal, such as hydraulic, pneumatic, electric, magnetorestrictive actuators, or any other suitable vibratory seismic source. In some embodiments, incident seismic signals may be emitted by a piezoelectric source, an electrodynamic linear motor actuator source, or a magnetorestrictive source. A piezoelectric seismic source may be a source that is powered by electricity. An electrodynamic linear motor actuator source may be a source driven by a moving magnet type actuator. In some embodiments, incident seismic signals may be designed to control the phase and amplitude of the harmonics of incident seismic signals. In certain example embodiments, the system and actuator used to emit incident seismic signals may have nonlinearities and may not behave ideally and thus may have a frequency response that adds a phase shift and/or amplitude droop at different frequencies. Therefore, in some embodiments, harmonics may be added to counteract the harmonics created by the nonlinearities in the vibrator. The output of the seismic source may be monitored, where the output is measured and compared to the designed seismic signal. The phase and amplitude of the harmonics included in the seismic signal may be adjusted to provide a mechanism for achieving the seismic signal as designed.

In some embodiments, the seismic incident signals are a monofrequency emitted by a SEISMOVIE™ system designed and manufactured by CGG Services SA (Massy, France). A SEISMOVIE™ system may emit energy at individual frequencies (for example, monofrequencies), one-by-one, until approximately the entire frequency band of interest is emitted. After the seismic source emits the frequency band, data processing techniques can reconstruct broad-band information in the time domain to cover the full spectrum covered by the monofrequencies. When each monofrequency signal is emitted, there may be a period of time between each signal where the signal tapers off before the next monofrequency signal begins. The tapering period may be used to limit sharp transitions between frequencies which may cause damage to the vibrating equipment in the seismic source.

In block 110, one or more seismic receivers receive reflected signals from the subterranean formation. In block 115, one or more of the reflected signals are divided into a plurality of sub-sample. The sub-samples may have a length that permits useful analysis of the frequency content of the sub-sample. In one example embodiment, the sub-samples are selected to be two seconds. In certain example embodiments, the sub-samples are chosen to have equal length. In some example embodiments, one or more of the sub-samples do not overlap. In other example embodiments, one or more of the sub-samples include overlapping times.

After sub-samples have been selected from the reflected signals, in block 120, the system determines a frequency content of the sub-sample. In certain example embodiments, the system performs a Fourier transform of the sub-sample to determine the frequency content of the sub-sample. A Fourier transform is used to transform a time domain representation of a signal into a frequency domain representation of the signal. A variety of signal processing techniques may be used to obtain the frequency domain representation of the signal. For example, in some embodiments, the seismic monitoring entity performs a fast Fourier transform (FFT) to determine the frequency content of the sub-sample.

The seismic monitoring entity of the present disclosure may use the frequency content of the sub-samples to estimate an amount of noise in the sub-sample. In certain example embodiments, the seismic monitoring entity estimates the amount of noise in the sub-sample based on the amplitude of frequency components that are not frequencies emitted by the seismic sources. In some embodiments, the seismic monitoring entity estimates the noise content of the sub-sample based on the amplitude of frequency components that are adjacent to one or more frequencies emitted by the seismic sources. In certain example embodiments, adjacent frequencies may be within 0.1 Hz, 0.2 Hz, 0.25 Hz, 0.3 Hz, 0.4 Hz, 0.5 Hz, 0.6 Hz, 0.7 Hz, 0.8 Hz, 0.9 Hz, 1 Hz, 2 Hz, 3 Hz, 4 Hz, 5 Hz, 6 Hz, 7 Hz, 8 Hz, 9 Hz, or 10 Hz of the frequencies of an incident signal emitted by one of the seismic sources. In other example embodiments adjacent frequencies may be within 1-5 percent of the frequencies of the incident seismic signals. In some example embodiments, the distance to an adjacent frequency is based on one or more acquisition parameters.

In still other example embodiments, the seismic monitoring entity may determine median values for one or more frequency components of the sub-samples. In some embodiments, the seismic monitoring entity may determine a median value for frequency components that are not emitted by the seismic sources, because such frequency components may be more indicative of the noise content of a sub-sample. The seismic monitoring entity may then determine a deviation of the frequency components of the sub-sample for the median value for the frequency components.

In block 125, the seismic monitoring entity assigns weights to the sub-samples based, at least in part, on the frequency content of the sub-samples determined in block 120. In certain example embodiments, a sub-sample may be rejected if its frequency content is indicative of noise. For example, a sub-sample may be entirely rejected where it contains frequency components that are indicative of noise that are 150% or more than the median for that frequency component across other sub-sample. In another example embodiment, a sub-sample may be entirely rejected where it contains frequency components that are indicative of noise that are 200% or more than the median for that frequency component across other sub-sample.

In other example embodiments, the frequency content of a sub-sample may be assigned a weight based on a comparison of the frequency components of the sub-sample to the frequency components of received signals from previous times. The subterranean monitoring operation may be repeated over time periods of hours, days, weeks, or years. Therefore the subterranean monitoring entity can determine median values for frequency components over the course of hours, days, weeks, or years. With such long-term monitoring, the subterranean monitoring entity is able to determine which values for frequency components are most likely. Accordingly, the subterranean monitoring entity is able to determine which frequency components value are most likely caused by noise in a given sample even where those frequency component values are relatively small. Therefore, in certain example implementations, a sub-sample may be rejected where the value of a frequency component is less than a median value for the frequency component. Therefore, in certain example implementations, a sub-sample may be rejected where the value of a frequency component is less than some chosen percentage of the median value for the frequency component.

In certain example embodiments, the subterranean monitoring entity may reject an entire sample due, for example, to the presence of noise in the sample. For example, if the incident signal had a frequency of 14 Hz and the resulting signal included noise in a rage around the incident signal (for example, an incident signal including noise around 15-30 Hz), the subterranean monitoring entity may reschedule the seismic source to use the 14 Hz incident signal at a later time in an attempt to avoid the noise. In some example embodiments, the subterranean monitoring entity may adaptively choose one or more frequencies for the incident signals based on the observed noise. In the prior example where noise was observed from 15-30 Hz, the subterranean monitoring entity may cause the seismic sources to emit an incident signal with a frequency above 30 Hz.

In certain example embodiments, the seismic monitoring entity determine one or more median values for frequency components of resulting signals measured at one or more earlier times where the same frequency incident signal was used for seismic monitoring of the subterranean formation. In certain example embodiments, a sub-sample may be rejected if its frequency content is indicative of noise, such as impulsive noise from a pumping operation or another impulsive noise source. For example, a sub-sample may be entirely rejected where it contains frequency components that are indicative of noise that are 150% or more than the median for that frequency component across other sub-samples. In another example embodiment, a sub-sample may be entirely rejected where it contains frequency components that are indicative of noise that are 200% or more than the median for that frequency component across other sub-samples.

In other example embodiments, certain frequency components of a sub-sample are filtered, reduced or removed, rather than the entire sub-sample. For example, the frequency components that are most likely cause by noise in the sub-sample may be filtered, reduced, or removed. The frequency components of a sub-sample may be rejected where the value of the frequency components is less than the median value for the frequency component, as discussed above.

In other example embodiments, a sub-sample is assigned a weight greater than zero based on frequency content of the sub-sample determined in block 120. The example weights may be based, least in part, on the amplitudes of the frequency components determined in block 120.

In block 130, the seismic monitoring entity combines the weighted sub-samples to create a weighted sample. In some example embodiments, the weighted sub-samples are summed to create the weighted sample. In still other embodiments, one or more sample may be combined as part of the analysis of the one or more properties of the subterranean formation. The combination of multiple samples with different incident signal frequencies may be referred to as a full shot record. The full shot record may then be analyzed to determine one or more properties of the subterranean formation.

In block 135, the seismic monitoring entity determines one or more properties of the subterranean formation based on the weighted sub-samples. In certain example embodiments, the weighted sub-samples are combined together to create a weighted sample. In certain example embodiments, the seismic monitoring entity determines an amount and location of fluid depletion from a reservoir based on the weighted sub-samples. In certain example embodiments, the seismic monitoring entity determines the progress of water injection into a subsurface formation based on the weighted sub-samples. In certain example embodiments, the seismic monitoring entity determines the progress of a well or formation enhancement operation based on the weighted sub-samples. Example enhancement operations may include steam injection or hydraulic fracturing. Other example operations may include gas storage Modifications, additions, or omissions may be made to method 100 without departing from the scope of the present disclosure. The order of the steps may be performed in a different manner than that described and some steps may be performed at the same time. Additionally, each individual step may include additional steps without departing from the scope of the present disclosure. Further, more steps may be added or steps may be removed without departing from the scope of the disclosure.

Figure 1B:
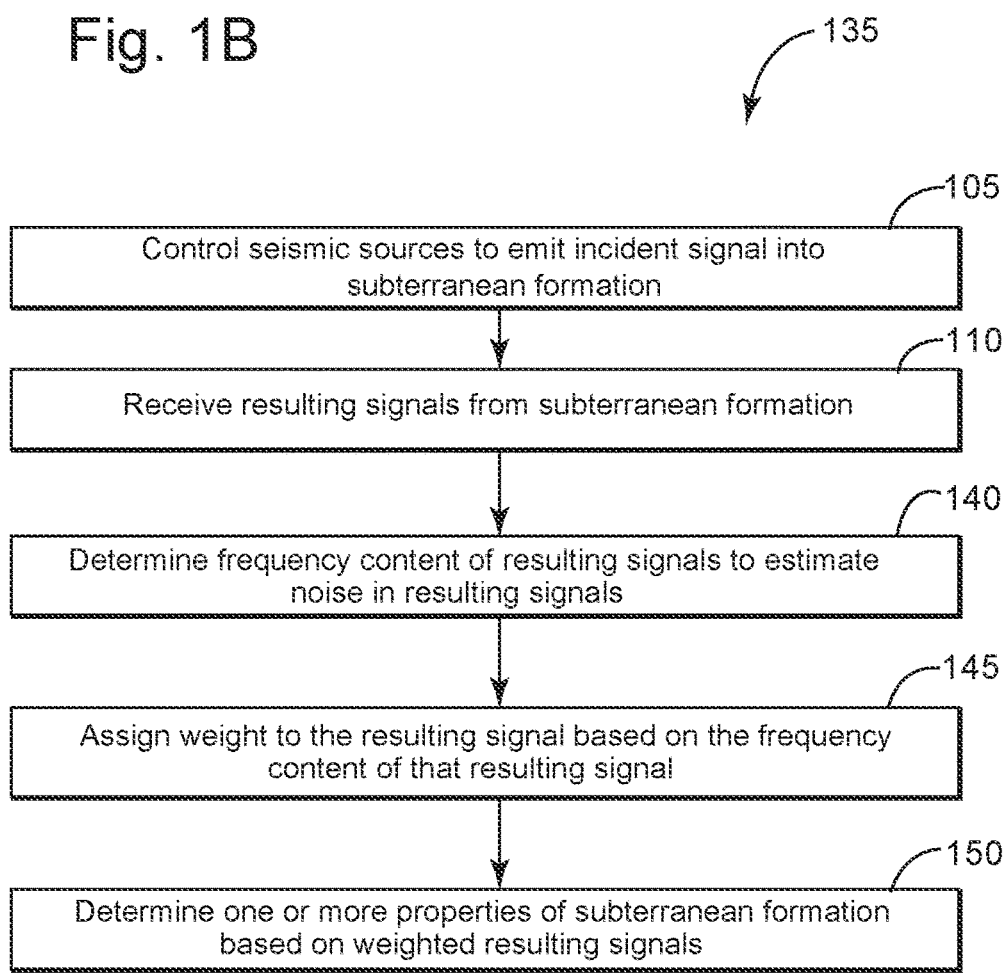

FIG. 1B is a flow chart of an example method of monitoring a subterranean formation. The steps of method 135 can be performed by an engineer or operator, a user, various computer programs, models, or any combination thereof, configured to deploy, operate, simulate, design, and analyze data from seismic exploration signal systems, equipment, or devices. The programs and models may include instructions stored on a computer-readable medium and operable to perform, when executed, one or more of the steps of the method. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer-readable media. Collectively, the engineer, operator, user, or computer programs and models used to deploy, operate, simulate, design, and analyze data from seismic exploration systems may be referred to as a "seismic monitoring entity."

Blocks 105 and 110 are performed, as described above with respect to FIG. 1A. In method 135, the seismic monitoring entity determines a frequency content of at least a portion of a plurality of reflected signals to estimate noise in the reflected signals. As discussed above, the seismic receivers may be distributed in an area above the subterranean formation of interest. The subterranean monitoring entity may determine a frequency content of received signals from different receivers to determine which of the receivers are currently receiving the most noise. The subterranean monitoring entity may use any of the methods described with respect to block 120 to make the determination of which received signals include noise. In block 145, based on the frequency content determined in block 140, the subterranean monitoring entity assigns a weight to the reflected signal. This weighting may be performed as discussed with respect to block 125 in FIG. 1A. In certain example embodiments, the subterranean monitoring entity may perform the steps of both blocks 140 and 145 of FIG. 1B to make a coarse determination of which signals to reject or weight and the steps of 115-120 to perform a further rejection or weighting of sub-sample of the received signal.

The subterranean monitoring entity then determines one or more properties of the subterranean formation based on the weighted reflected signals in block 150. This determination may include any of the steps described with respect to block 130 of FIG. 1A.

Modifications, additions, or omissions may be made to method 135 without departing from the scope of the present disclosure. The order of the steps may be performed in a different manner than that described and some steps may be performed at the same time. Additionally, each individual step may include additional steps without departing from the scope of the present disclosure. Further, more steps may be added or steps may be removed without departing from the scope of the disclosure.

The methods described with reference to FIGS. 1A and 1B is used to enhance the effectiveness of a system used to emit seismic signals, receive reflected signals, and process the resulting data to monitor a subterranean formation. The methods described with reference to FIGS. 1A and 1B is used to enhance the effectiveness of a system used to emit seismic signals, receive resulting signals, and process the resulting data to monitor an operation in a subterranean formation, such as a steam injection operation, a hydraulic fracturing operation, or other reservoir enhancement operation. FIG. 2 illustrates an elevation view of an example seismic monitoring entity 200 configured to produce images of the earth's subsurface geological structure in accordance with some embodiments of the present disclosure. The images produced by system 200 allow for the evaluation of subsurface geology. System 200 may include one or more seismic energy sources 202 and one or more receivers 214 which are located within a pre-determined exploration area. The exploration area may be any defined area selected for seismic survey or exploration. Survey of the exploration area may include the activation of seismic source 202 that radiates an acoustic wave field that expands downwardly through the layers beneath the earth's surface. The seismic wave field is then partially reflected or refracted from the respective layers as a wave front recorded by receivers 214. For example, seismic source 202 generates seismic waves and seismic receivers 214 record seismic waves 232 and 234 reflected from interfaces between subsurface layers 224, 226, and 228, oil and gas reservoirs, such as target reservoir 230, or other subsurface structures. Subsurface layers 224, 226, and 228 may have various densities, thicknesses, or other characteristics. Target reservoir 230 may be separated from surface 222 by multiple layers 224, 226, and 228. As the embodiment depicted in FIG. 2 is exemplary only, there may be more or fewer layers 224, 226, or 228 or target reservoirs 230. Similarly, there may be more or fewer seismic waves 232 and 234. Additionally, some seismic source waves will not be reflected, as illustrated by seismic wave 240. In addition, in some cases other waves (not expressly shown) may be present that may be useful in imaging a formation or for computing seismic attributes such as refracted waves or mode converted waves.

Seismic energy source 202 may be referred to as an acoustic source, seismic source, energy source, and source 202. In some embodiments, seismic source 202 is located on, buried beneath, or proximate to surface 222 of the earth within an exploration area. A particular seismic source 202 may be spaced apart from other similar seismic sources. Seismic source 202 may be operated by a central controller that coordinates the operation of several seismic sources 202. Further, a positioning system, such as a global positioning system (GPS), may be utilized to locate and time-correlate seismic sources 202 and receivers 214. Multiple seismic sources 202 may be used to improve data collection efficiency, provide greater azimuthal diversity, improve the signal to noise ratio, and improve spatial sampling. The use of multiple seismic sources 202 can also input a stronger seismic signal into the ground than a single, independent seismic source 202. Seismic sources 202 may also have different capabilities and the use of multiple seismic sources 202 may allow for some seismic sources 202 to be used at lower frequencies in the spectrum and other seismic sources 202 at higher frequencies in the spectrum.

Seismic source 202 may comprise any type of seismic device that generates controlled seismic energy used to perform reflection or refraction seismic surveys, such as seismic vibratory sources such as a seismic vibrator, vibroseis, an air gun, a thumper truck, marine vibrators, magnetic vibrators, piezoelectric vibrators, or any source suitable for emitting a controlled seismic signal. In some embodiments, seismic source 202 may be a piezoelectric source, an encoded pulsed source, or other similar system, such as SEISMOVIE™, designed to generate a monofrequency. For example, the seismic signal emitted in step 208 as described in FIG. 2 may be emitted by seismic source 202.

Seismic source 202 may radiate varying frequencies or one or more monofrequencies of seismic energy into surface 222 and subsurface formations during a defined interval of time. Seismic source 202 may impart energy through a sweep of multiple frequencies or at a single monofrequency, or through a combination of at least one sweep and at least one monofrequency or through the use of pseudorandom sweeps. In some embodiments, seismic source 202 may be part of an array of seismic sources and may emit a series of frequencies such that no source in the array emits the same signal at the same time. In certain example embodiments, the one or more of the seismic sources 202 may skip or hop to different emitted frequencies over time.

Seismic exploration system 200 may include monitoring equipment 212 that operates to record reflected energy seismic waves 232, 234, and 236. Monitoring equipment 212 may include one or more receivers 214, network 216, recording unit 218, and processing unit 220. In some embodiments, monitoring equipment 212 may be located remotely from seismic source 202.

Receiver 214 may be located on, buried beneath, or proximate to surface 222 of the earth within an exploration area. Receiver 214 may be any type of instrument that is operable to transform seismic energy or vibrations into a signal compatible with the data acquisition system, for example a voltage signal, a current signal, or an optical signal. For example, receiver 214 may be a vertical, horizontal, or multicomponent geophone, accelerometers, or optical fiber or distributed acoustic sensor (DAS) with wire or wireless data transmission, such as a three component (3C) geophone, a 3C accelerometer, hydrophone, or a 3C Digital Sensor Unit (DSU). Multiple receivers 214 may be utilized within an exploration area to provide data related to multiple locations and distances from seismic sources 202. Receivers 214 may be positioned in multiple configurations, such as linear, grid, array, or any other suitable configuration. In some embodiments, receivers 214 may be positioned along one or more strings 238. Each receiver 214 is typically spaced apart from adjacent receivers 214 in the string 238. Spacing between receivers 214 in string 238 may be approximately the same preselected distance, or span, or the spacing may vary depending on a particular application, exploration area topology, or any other suitable parameter.

One or more receivers 214 transmit raw seismic data from reflected seismic energy via network 216 to recording unit 218. Recording unit 218 transmits raw seismic data to processing unit 220 via network 216. Processing unit 220 performs seismic data processing on the raw seismic data to prepare the data for interpretation. For example, processing unit 220 may perform the data processing techniques described in steps 210 and 214 in FIG. 2. Although discussed separately, recording unit 218 and processing unit 220 may be configured as separate units or as a single unit. Recording unit 218 or processing unit 220 may include any equipment or combination of equipment operable to compute, classify, process, transmit, receive, store, display, record, or utilize any form of information, intelligence, or data. Recording unit 218 may record the reflected seismic waves from the seismic source, as described with respect to step 210 of FIG. 2. For example, recording unit 218 and processing unit 220 may include one or more personal computers, storage devices, servers, or any other suitable device and may vary in size, shape, performance, functionality, and price. Recording unit 218 and processing unit 220 may include random access memory (RAM), one or more processing resources, such as a central processing unit (CPU) or hardware or software control logic, or other types of volatile or non-volatile memory. Additional components of recording unit 218 and processing unit 220 may include one or more disk drives, one or more network ports for communicating with external devices, one or more input/output (I/O) devices, such as a keyboard, a mouse, or a video display. Recording unit 218 or processing unit 220 may be located in a station truck or any other suitable enclosure.

Network 216 may be configured to communicatively couple one or more components of monitoring equipment 212 with any other component of monitoring equipment 212. For example, network 216 may communicatively couple receivers 214 with recording unit 218 and processing unit 220. Further, network 214 may communicatively couple a particular receiver 214 with other receivers 214. Network 214 may be any type of network that provides communication, such as one or more of a wireless network, a local area network (LAN), or a wide area network (WAN), such as the Internet. For example, network 214 may provide for communication of reflected energy and noise energy from receivers 214 to recording unit 218 and processing unit 220.

The seismic survey conducted using seismic source 202 may be repeated at various time intervals to determine changes in target reservoir 230. The time intervals may be months or years apart. Data may be collected and organized based on offset distances, such as the distance between a particular seismic source 202 and a particular receiver 214 and the amount of time it takes for seismic waves 232 and 234 from a seismic source 202 to reach a particular receiver 214. Data collected during a survey by receivers 214 may be reflected in traces that may be gathered, processed, and utilized to generate a model of the subsurface structure or variations of the structure, for example 4D monitoring.

Figure 3:
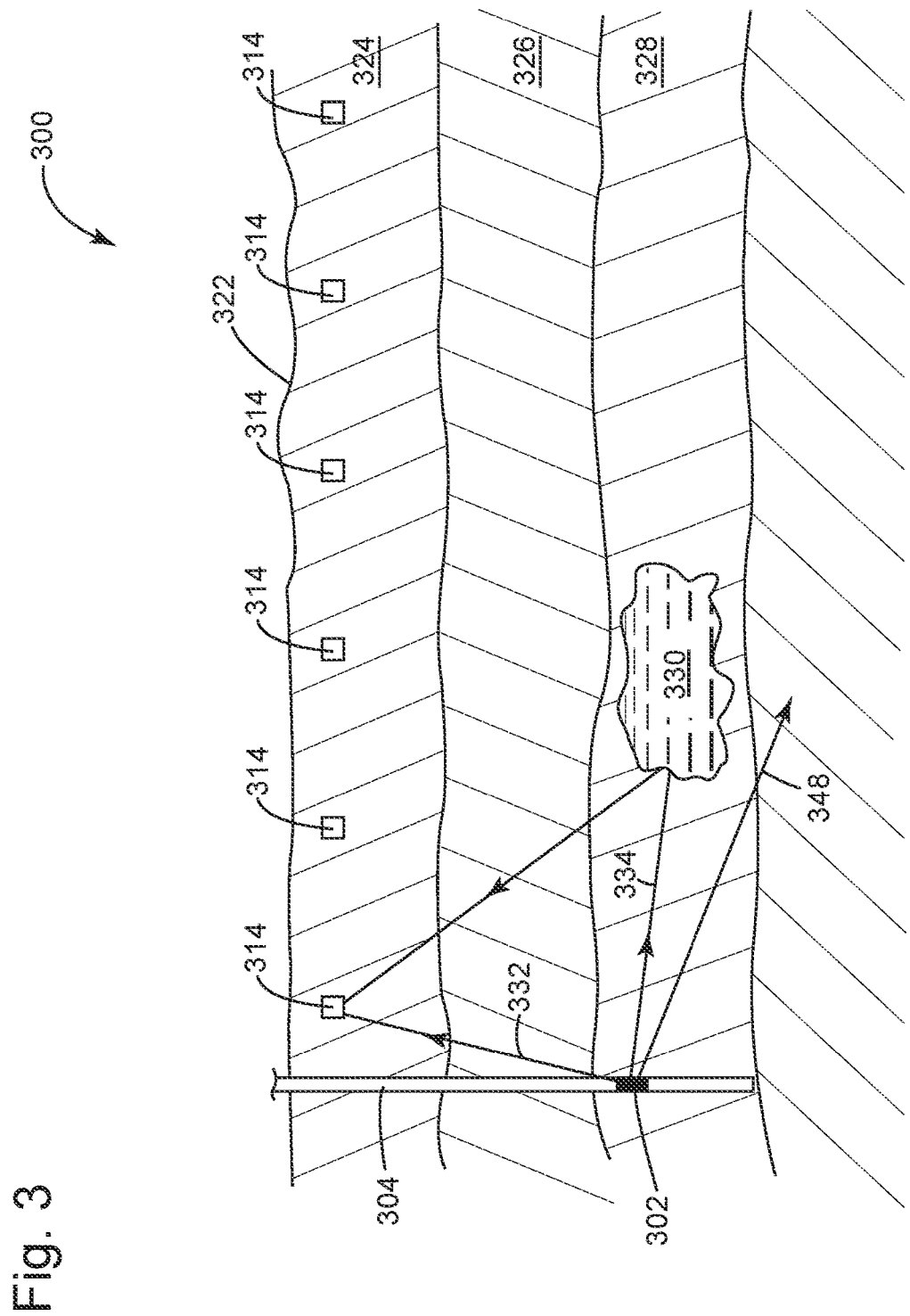

As an example of a second seismic subterranean monitoring system, FIG. 3 illustrates an elevation view of an example seismic monitoring entity 300 configured to monitor the earth's subsurface geological structure in accordance with some embodiments of the present disclosure. Seismic system 300 includes seismic source 302 that may be provided in borehole 304. In certain example embodiments, borehole 304 may be positioned to deplete a subterranean fluid reservoir. Seismic source 302 may be any known seismic source. For example, seismic source 302 may be a SEISMOVIE™ source that may include piezoelectric vibrator elements that provide a wide bandwidth and high reliability/repeatability. Seismic source 302 may radiate an acoustic wave field that expands through the layers beneath the earth's surface. For example, seismic source 302 generates seismic waves and receivers 314 record seismic waves 332 and 334 reflected by interfaces between subsurface layers 324, 326, and 328, oil and gas reservoirs, such as target reservoir 330, or other subsurface structures. As the embodiment depicted in FIG. 4 is exemplary only, there may be more or fewer layers 324, 326, or 328 or target reservoirs 330. Similarly, there may be more or fewer seismic waves 332 and 334. Additionally, some seismic source waves will not be reflected, as illustrated by seismic wave 340. While seismic source 302 is shown in FIG. 3 as being in well 304, seismic source 302 may be installed in surface 322. In other implementations there may be multiple seismic sources 302. In certain example embodiments, there may be a plurality of seismic sources positioned above a subsurface region of interest. In one example embodiment, 57 seismic sources 302 are placed over an approximately two kilometer square area.

One or more receivers 314 may be buried at a predetermined depth relative to the surface of the earth 322 or may be placed on the surface of the earth 322. The predetermined depth may be a distance larger than zero and smaller than the depth of reservoir 330, for example, predetermined depth may be approximately twelve meters. Receiver 314 may be any type of instrument that is operable to transform seismic energy or vibrations into a voltage signal. For example, receiver 314 may be a vertical, horizontal, or multicomponent geophone, accelerometers, or optical fiber or distributed acoustic sensor (DAS) with wire or wireless data transmission, such as a three component (3C) geophone, a 3C accelerometer, hydrophone, or a 3C Digital Sensor Unit (DSU).

In one embodiment, system 300 may include hundreds of receivers 314 and tens of seismic sources 302 configured to continuously emitting seismic waves. Seismic sources 302 may be provided in borehole 304 (or multiple boreholes 304) at a depth, for example approximately eighty meters. In some example embodiments, the borehole 304 may include one or more vertical, horizontal, or deviated components. The data may be generated for over a period of days, weeks, or months. One or more receivers 314 may transmit raw seismic data from reflected seismic energy via a network to a recording unit, as described with reference to FIG. 3. The recording unit may transmit raw seismic data to a processing unit via a network. The processing unit may perform seismic data processing on the raw seismic data to prepare the data for interpretation.

Although discussed with reference to a land implementation, embodiments of the present disclosure are also useful in transition zone and marine applications. In a transition zone application, seismic sources 202 or 302 may include magnetorestrictive actuators. In certain example embodiments, the seismic sources 202 and 302 and seismic receivers are in fixed locations. Embodiments of the present disclosure may also be used in a seabed acquisition application. In a seabed acquisition application, where receiver 214 or 314 is placed on the seabed, monitoring equipment 212 or 312 may include 3C geophone and hydrophones. The seismic sources and receivers in such an embodiment may include any of the seismic sources and receivers there were discussed previously. Embodiments of the present disclosure may also be used in a transition zone application. The seismic sources and receivers in such an embodiment may include any of the seismic sources and receivers there were discussed previously.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, a receiver does not have to be turned on but may be configured to receive reflected energy.

Figure 4A:
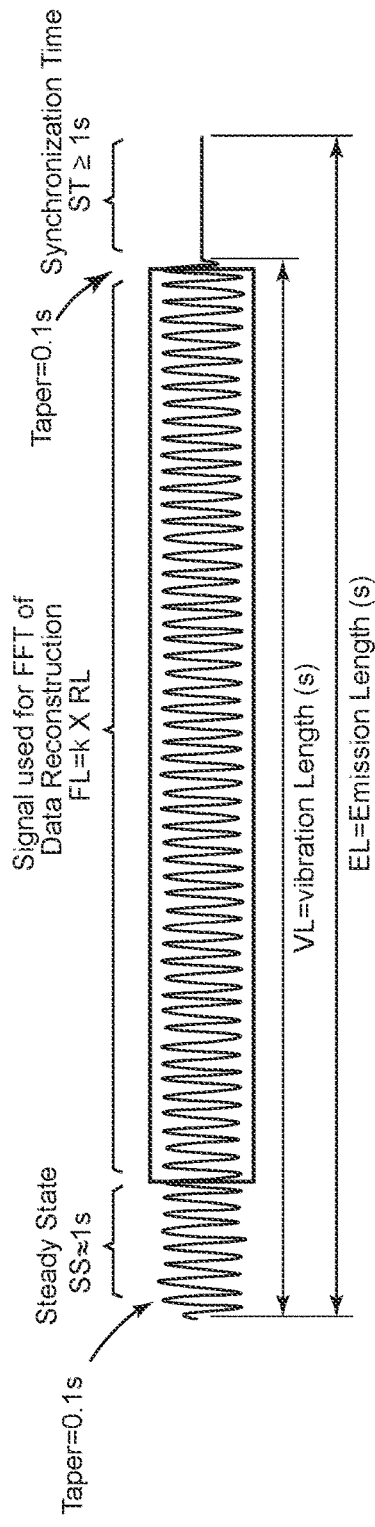
FIG. 4A diagrammatically shows an example signal received by a seismic receiver.

FIG. 4A diagrammatically shows an example single resulting signal received by a seismic receiver. Example resulting signals may be caused when an incident signal is reflected or refracted by features in the subterranean formation. FIG. 4A shows the amplitude of the received resulting signal versus time. The received resulting signal is characterized by a total emission length (EL) and a vibration length (VL). The signal begins with a taper period. In the example embodiment of FIG. 4, the taper period is 0.1 seconds. Other example embodiments may have different taper times. Next, the received resulting signal includes a steady-state period of 1 second. The following portion of the received resulting signal next is a portion for analysis by method 100 or 135 of FIGS. 1A and 1B, respectively. Note that in FIG. 4A, the portion of the resulting signal for analysis is a monofrequency with little or no noise present. This type of regular signal is that may be received by a seismic receiver is a monofrequency acquisition system. The time for analysis is then followed by another taper time and finally by a synchronization time (ST) period where no vibration is induced in the subterranean formation.

Figure 4B:
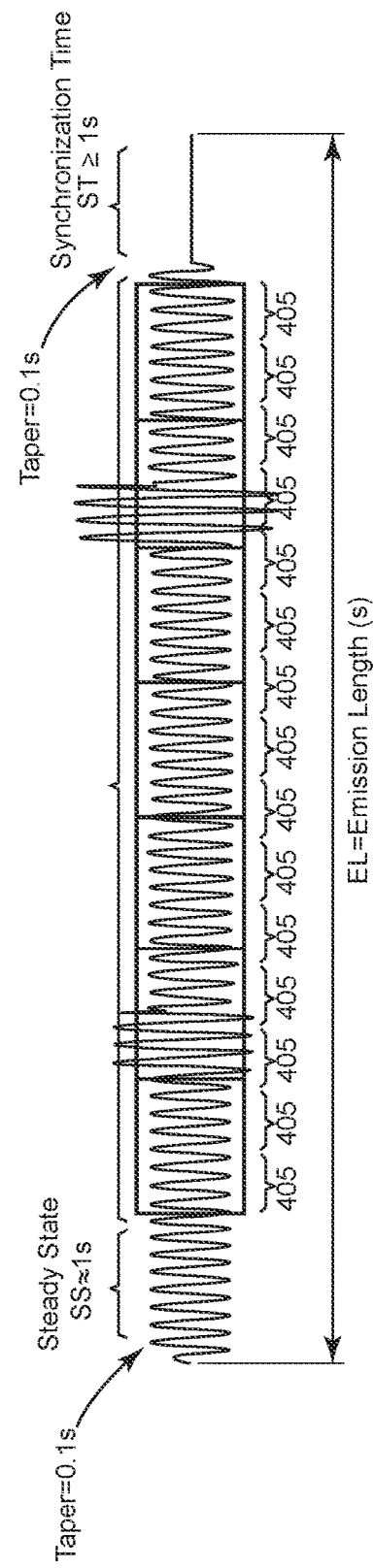
FIG. 4B diagrammatically shows an example signal received by a seismic receiver according to certain embodiments of the present disclosure.

FIG. 4B diagrammatically shows an example single resulting signal received by a seismic receiver according to certain embodiments of the present disclosure. In FIG. 4B, the resulting signal portion is depicted as being divided into sub-samples. The sub-sampling may be accomplished based on the method described, for example, with respect to FIG. 1A OR 1B.

In contrast to the regular and noise-free signal for analysis shown in FIG. 4A, the signal for analysis in FIG. 4B includes portions with noise and aptitude spikes. As discussed above with respect to method 100, the system divides the portion of the resulting signal for analysis into sub-samples 405. In some example embodiments, the sub-sample may include overlapping times. In other example implementations, the sub-samples do not include overlapping times. The seismic monitoring entity then performs a Fourier transformation on the sub-samples to determine the frequency content of the sub-samples 405. Once the sub-sample are converted to frequency domain representations, the seismic monitoring entity is able to perform weighting or filtering of the sub-samples 405 based on the frequency content of the sub-samples 405. In embodiments where the incident frequency is known, the seismic monitoring entity is able to reduce or eliminate noise frequency components of the sub-samples 405. For example, as discussed above with respect to FIG. 1A, in the case of monofrequency emissions, the seismic monitoring entity may determine if frequencies that are adjacent to the frequency of the incident signal are above a median value for that frequency. Based on result of that comparison, the frequency components of the sub-sample may be weighted to minimize the contribution of the sub-sample to a later combination of the weighted sub-samples 405. In other example embodiments, the frequency components of the sub-sample that are identified as noise are weighted to reduce or eliminate the noise components. The use of monofrequency emissions allows the seismic monitoring entity to directly assess the actual noise level during acquisition by assessing the nearby non-emitted frequencies. After the seismic monitoring entity has assigned weights to the sub-samples or to frequency components of the sub-samples, the system may combine the subsamples 405 to perform further analysis. In certain example implementations, the seismic monitoring entity will generate an image of the subterranean formation.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. The computer processor may serve as a seismic exploration entity as described in methods 100 and 135 and in FIGS. 1A and 1B.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability. For example, the seismic exploration entity described in methods 100 and 135 and in FIGS. 1A and 1B may be stored in tangible computer-readable storage media.

Although the present disclosure has been described with respect to monitoring a subterranean formation, the signal processing techniques of the present disclosure may be applied to other applications without departing from this disclosure. Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate. Instead, the scope of the present disclosure is defined by the appended claims.

The invention claimed is:

1. A method of seismic monitoring of a subterranean formation comprising:
   receiving resulting signals emanating from the subterranean formation, wherein the resulting signals are caused, at least in part, by incident signals emitted from a plurality of seismic sources located above the subsurface formation and wherein the resulting signals are received for a predetermined emission length of time;
   dividing a total time length of at least a part of the resulting signals into a plurality of sub-samples such that each sub-sample has a time length smaller than the total time length;
   for one or more of the sub-samples:
      determining a frequency content of the sub-sample in a frequency domain; and
      assigning a weight to one or more components of the frequency content of the sub-sample to produce a weighted frequency content of the sub-sample, wherein the assigned weight is based, at least in part, on a comparison of (1) the frequency components of the sub-sample to (2) frequency components of received signals from previous times;
   combining the weighted frequency contents of the sub-samples to produce a weighted sample; and
   determining one or more properties of the subsurface formation based, at least in part, on the weighted sample.

2. The method of claim 1, wherein the step of assigning a weight to one or more components of the frequency content of the sub-sample to produce a weighted frequency content of the sub-sample is based, at least in part, on an estimate of the amount of noise present in the frequency content of the sub-sample and further comprises:
   determining one or more amplitudes of frequency components of the sub-sample that are adjacent to one or more frequencies of the incident signals.

3. The method of claim 2, further comprising:
determining a set of median value for frequency components that are adjacent to one or more frequencies of the incident signals; and
wherein assigning a weight to one or more components of the frequency content of the sub-sample to produce a weighted frequency content of the sub-sample further comprises determining if the amplitude a frequency component of the sub-sample is above a corresponding median value for the frequency component and, if so, removing the frequency component from the sub-sample.

4. The method of claim 1, wherein determining one or more properties of the subsurface formation based, at least in part, on the weighted sample further comprises:
combining a plurality of weighted samples, wherein the weights samples correspond to a plurality of received resulting signals based on monofrequency incident signals with different frequencies; and
determining one or more properties of the subsurface formation based, at least in part, on the combined plurality of weighted samples.

5. The method of claim 1, further comprising:
controlling the plurality of seismic sources to each emit an incident signal having a selected frequency for a predetermined emission length of time.

6. The method of claim 5, wherein the selected frequency for two or more of the seismic sources is the same.

7. The method of claim 1, wherein determining one more properties of the subsurface formation based, at least in part, on the frequency content of the sub-samples, as weighted by the weight of the sub-sample comprises:
monitoring fluid production from the subsurface formation.

8. The method of claim 1, wherein determining one more properties of the subsurface formation based, at least in part, on the frequency content of the sub-samples, as weighted by the weight of the sub-sample comprises:
monitoring a steam injection operation in the subsurface formation.

9. The method of claim 1, wherein the sub-samples have equal lengths.

10. A seismic monitoring system, comprising:
one or more seismic sources to emit incident signals into a subterranean formation for a predetermined emission length of time;
one or more seismic receivers to receive resulting signals emanating from the subsurface formation;
at least one processor; and
a memory including non-transitory executable instructions that, when, executed cause the at least one processor to:
divide a total time length of at least a part of the resulting signals into a plurality of sub-samples such that each sub-sample has a time length smaller than the total time length;
for one or more of the sub-samples:
determine a frequency content of the sub-sample in a frequency domain; and
assign a weight to one or more components of the frequency content of the sub-sample to produce a weighted frequency content of the sub-sample, wherein the assigned weight is based, at least in part, on a comparison of (1) the frequency components of the sub-sample to (2) frequency components of received signals from previous times;
combine the weighted frequency contents of the sub-samples to produce a weighted sample; and
determine one or more properties of the subsurface formation based, at least in part, on the weighted sample.

11. The seismic monitoring system of claim 10, wherein the executable instructions that cause the at least one processor to assigning a weight to one or more components of the frequency content of the sub-sample to produce a weighted frequency content of the sub-sample, wherein the assigned weight is based, at least in part, on an estimate of the amount of noise present in the frequency content of the sub-sample comprises further causes the at least one processor to:
determine one or more amplitudes of frequency components of the sub-sample that are adjacent to one or more frequencies of the incident signals.

12. The seismic monitoring system of claim 10, wherein the executable instructions further cause the at least one processor to:
determine a set of median value for frequency components that are adjacent to one or more frequencies of the incident signals; and
wherein the executable instructions that case the at least one processor to assign a weight to one or more components of the frequency content of the sub-sample to produce a weighted frequency content of the sub-sample further cause the at least one processor to:
determine if the amplitude a frequency component of the sub-sample is above a corresponding median value for the frequency component and, if so, removing the frequency component from the sub-sample.

13. The seismic monitoring system of claim 10, wherein the executable instructions further cause the at least one processor to:
combine a plurality of weighted samples, wherein the weights samples correspond to a plurality of received resulting signals based on monofrequency incident signals with different frequencies; and
determine one or more properties of the subsurface formation based, at least in part, on the combined plurality of weighted samples.

14. The seismic monitoring system of claim 10, wherein the executable instructions that cause the at least one processor to determine a frequency content of the sub-sample further causes the at least one processor to:
determine whether the sub-sample includes frequency components that are indicative of impulsive signals or noise.

15. The seismic monitoring system of claim 10, wherein the executable instructions further cause the at least one processor to:
control the plurality of seismic sources to each emit an incident signal having a selected frequency for a predetermined emission length of time.

16. A non-transitory computer-readable medium, comprising instructions that, when executed by a processor, cause the processor to:
receive resulting signals emanating from the subterranean formation, wherein the resulting signals are caused, at least in part, by incident signals emitted from a plurality of sources located above the subsurface formation and wherein the resulting signals are received for a predetermined emission length of time;
divide a total time length of at least a part of the resulting signals into a plurality of sub-samples such that each sub-sample has a time length smaller than the total time length;

for one or more of the sub-samples:
  determine a frequency content of the sub-sample in a frequency domain; and
  assign a weight to one or more components of the frequency content of the sub-sample to produce a weighted frequency content of the sub-sample, wherein the assigned weight is based, at least in part, on a comparison of (1) the frequency components of the sub-sample to (2) frequency components of received signals from previous times;
combine the weighted frequency contents of the sub-samples to produce a weighted sample; and
determine one or more properties of the subsurface formation based, at least in part, on the weighted sample.

17. The non-transitory computer-readable medium of claim 16, wherein the executable instructions that cause the at least one processor to assign a weight to one or more components of the frequency content of the sub-sample to produce a weighted frequency content of the sub-sample, and wherein the assigned weight is based, at least in part, on an estimate of the amount of noise present in the frequency content of the sub-sample, further causes the at least one processor to:
  determine one or more amplitudes of frequency components of the sub-sample that are adjacent to one or more frequencies of the incident signals.

18. The non-transitory computer-readable medium of claim 16, wherein the executable instructions further cause the at least one processor to:
  determine a set of median value for frequency components that are adjacent to one or more frequencies of the incident signals; and
  wherein the executable instructions that case the at least one processor to assign a weight to one or more components of the frequency content of the sub-sample to produce a weighted frequency content of the sub-sample further cause the at least one processor to:
    determine if the amplitude a frequency component of the sub-sample is above a corresponding median value for the frequency component and, if so, removing the frequency component from the sub-sample.

19. The non-transitory computer-readable medium of claim 16, wherein the executable instructions that cause the processor to determine a frequency content of the sub-sample further cause the processor to:
  determine whether the sub-sample includes frequency components that are indicative of impulsive signals or noise.

20. The non-transitory computer-readable medium of claim 16, further comprising executable instructions that cause the processor to: control a plurality of seismic sources to each emit an incident signal having a selected frequency for a predetermined emission length of time.

* * * * *